(12) United States Patent
Byeon (10) Patent No.: US 11,293,357 B2
(45) Date of Patent: Apr. 5, 2022

(54) METHOD FOR CONTROLLING AN ENGINE OF A VEHICLE

(71) Applicants: HYUNDAI MOTOR COMPANY, Seoul (KR); KIA MOTORS CORPORATION, Seoul (KR)

(72) Inventor: Min Byeon, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 144 days.

(21) Appl. No.: 16/692,580

(22) Filed: Nov. 22, 2019

(65) Prior Publication Data

US 2021/0017917 A1 Jan. 21, 2021

(30) Foreign Application Priority Data

Jul. 19, 2019 (KR) .................. 10-2019-0087516

(51) Int. Cl.
*F02D 11/10* (2006.01)
*F02D 41/34* (2006.01)
*F02D 41/00* (2006.01)
*F02D 41/02* (2006.01)

(52) U.S. Cl.
CPC ........ *F02D 11/105* (2013.01); *F02D 41/0002* (2013.01); *F02D 41/023* (2013.01); *F02D 41/345* (2013.01)

(58) Field of Classification Search
CPC .... F02D 41/0002; F02D 41/023; F02D 41/40; F02D 11/105
See application file for complete search history.

(56) References Cited

U.S. PATENT DOCUMENTS

| 2004/0106498 | A1* | 6/2004 | Badillo | F16H 63/502 477/109 |
| 2013/0045835 | A1* | 2/2013 | Schang | B60W 10/06 477/78 |
| 2015/0266464 | A1* | 9/2015 | Nefcy | F16H 61/061 477/15 |
| 2015/0377150 | A1* | 12/2015 | Naik | F02D 11/105 123/399 |
| 2019/0264621 | A1* | 8/2019 | Hagari | F02P 5/152 |
| 2019/0264624 | A1* | 8/2019 | Hagari | F02P 5/045 |

* cited by examiner

*Primary Examiner* — Sizo B Vilakazi
*Assistant Examiner* — Anthony L Bacon
(74) *Attorney, Agent, or Firm* — Morgan, Lewis & Bockius LLP (57) ABSTRACT

An method for controlling an engine of a vehicle having the engine and a transmission may include communicating an air-controlled torque request signal between a transmission controller and an engine controller, adjusting an output torque of the engine by controlling an intake air amount of the engine based on the air-controlled torque request signal, communicating an ignition-and-fuel-controlled torque request signal between the transmission controller and the engine controller, determining a target torque value based on the ignition-and-fuel-controlled torque request signal, and adjusting the output torque of the engine by controlling an ignition timing and/or a fuel amount of the engine based on the target torque value.

13 Claims, 5 Drawing Sheets

METHOD FOR CONTROLLING AN ENGINE OF A VEHICLE

CROSS-REFERENCE TO RELATED APPLICATION

This application claims priority to and the benefit of Korean Patent Application No. 10-2019-0087516 filed in the Korean Intellectual Property Office on Jul. 19, 2019, the entire contents of which are incorporated herein by reference.

BACKGROUND

(a) Field

The present disclosure relates to a method for controlling an engine of a vehicle.

(b) Description of the Related Art

A classification of a transmission of a vehicle may include two categories of a manual transmission (MT) and an automatic transmission (AT).

An automatic transmission automatically performs a shifting operation by using fluid control, and typically includes a torque converter that provides a so-called torque multiplication. Such an automatic transmission performs a shifting operation based on a predetermined shifting pattern, based on a vehicle speed and/or an accelerator pedal operation of a driver.

Shifting operation of a manual transmission is performed manually by a driver, where the driver presses a clutch pedal to operate the clutch to disengage the engine and the transmission and then shifts a gear by a gear lever.

Recently, an automated manual transmission (AMT) has been developed, where a shifting operation is automated based on a manual transmission scheme. An automated manual transmission automates shifting operation while employing a similar internal scheme of a manual transmission and a shifting operation may be initiated manually or automatically.

The disclosure of this section is to provide background information relating to the invention. Applicant does not admit that any information contained in this section constitutes prior art.

SUMMARY

Aspects of the present invention provide a method for controlling an engine of a vehicle attempting to provide advantages of enhanced fuel efficiency, reduced noxious gas, a fast and precise control.

An method for controlling an engine of a vehicle may include, communicating an air-controlled torque request signal between a transmission controller and an engine controller, adjusting an output torque of the engine by controlling an intake air amount of the engine based on the air-controlled torque request signal, communicating an ignition-and-fuel-controlled torque request signal between the transmission controller and the engine controller, determining a target torque value based on the ignition-and-fuel-controlled torque request signal, and adjusting the output torque of the engine by controlling an ignition timing and/or a fuel amount of the engine based on the target torque value.

A method for controlling an engine of a vehicle may further include, after the adjusting of the output torque of the engine by controlling the ignition timing and/or the fuel amount, detecting an actual output torque value of the engine, and performing a fuel cut control of the engine based on the target torque value and the actual output torque value.

The performing of the fuel cut control of the engine may include, calculating a torque difference value between the target torque value and the actual output torque value, determining whether the torque difference value exceeds a reference value, determining the number of cylinders to perform the fuel cut control, when the torque difference value exceeds the reference value, and performing the fuel cut control with respect to the number of cylinders.

A method for controlling an engine of a vehicle may further include, after the adjusting of the output torque of the engine by controlling the ignition timing and/or the fuel amount, checking operation state data of the engine, generating an engine torque signal based on the operation state data of the engine, and communicating the engine torque signal between the engine controller and the transmission controller.

The operation state data may include at least one of an intake air amount, a lambda value, and a rotation speed of the engine.

The engine torque signal may represent an actual output torque of the engine.

An method for controlling of an engine of a vehicle, the vehicle comprising a transmission, a transmission controller to control the transmission, and an engine controller to control the engine, the method comprising, communicating an air-controlled torque request signal between the transmission controller and the engine controller, adjusting an output torque of the engine by controlling an intake air amount of the engine based on the air-controlled torque request signal, communicating an ignition-and-fuel-controlled torque request signal between the transmission controller and the engine controller, based on the ignition-and-fuel-controlled torque request signal, adjusting the output torque of the engine by controlling an ignition timing and/or a fuel amount, detecting an actual output torque value of the engine, and performing a fuel cut control of the engine based on the actual output torque value of the engine.

According to an embodiment, by adjusting, e.g., decreasing, the output torque of the engine 110 firstly and primarily by controlling the intake air amount of the engine 110 and subsequently and secondarily by controlling the ignition timing and the fuel injection amount, fuel efficiency may be improved and noxious component in the exhaust gas may be decreased.

In addition, by controlling the output torque of the engine 110 by the two separate signals of the air-controlled torque request signal and the ignition-and-fuel-controlled torque request signal, the output torque of the engine 110 may be controlled to match the desired output curve rapidly and also precisely.

Other effects that may be obtained or are predicted by an embodiment of the present invention will be explicitly or implicitly described in a detailed description of the present invention. That is, various effects that are predicted according to an embodiment of the present invention will be described in the following detailed description.

DETAILED DESCRIPTION OF EMBODIMENTS

Hereinafter, a method for controlling an engine of a vehicle according to an embodiment of the present invention is described in detail with reference to the drawings. However, the drawings to be described below and the following detailed description relate to one embodiment of various embodiments for effectively explaining the features and characteristics of the present invention. Therefore, the present invention should not be construed as being limited to the drawings and the following description.

Further, in the description of embodiments of the present invention, the detailed description of related well-known configurations and functions is not provided when it is determined as unnecessarily making the scope of the present invention unclear. In addition, the terminologies to be described below are ones defined in consideration of their function in an embodiment of the present invention and may be changed by the intention of a user, an operator, or a custom. Therefore, their definition should be made on the basis of the description of the present disclosure.

Further, in the following embodiments, the terminologies are appropriately changed, combined, or divided so that those skilled in the art can clearly understand them, in order to efficiently explain the main technical characteristics of the present invention, but the present invention is not limited thereto.

Hereinafter, embodiments of the present invention will be described in detail with reference to the accompanying drawings.

Figure 1:
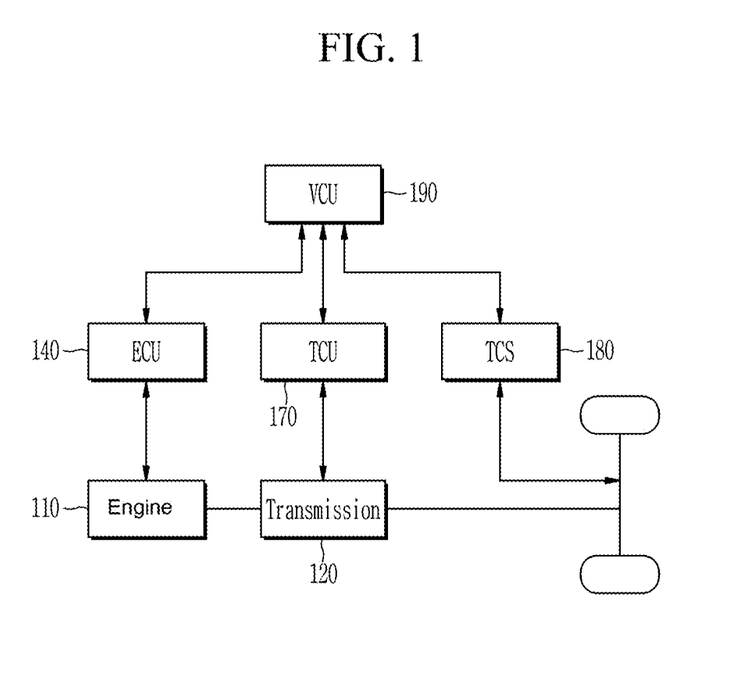
FIG. 1 is a schematic diagram of a vehicle to which a method for controlling an engine of a vehicle according to an embodiment of the present invention is applied.

FIG. 1 is a schematic diagram of a vehicle to which a method for controlling an engine of a vehicle according to an embodiment of the present invention is applied.

Referring to FIG. 1, a vehicle includes an engine 110, a transmission 120, an engine controller 140 that may be also called an engine control unit (ECU), a transmission controller 170 that may be also called a transmission control unit (TCU), a traction controller 180 that may be also called a traction control system (TCS), and a vehicle controller 190 that may be also called a vehicle control unit (VCU).

The engine 110 transforms a chemical energy of the fuel to a mechanical energy, by combustion of the fuel with the air. The engine 110 is operated under a control of the ECU 140, and the ECU 140 may detect an operation state of the engine 110.

The TCU 170 may initiate a shifting operation of the transmission 120, for example, by a driver's operation of a shift lever when the transmission 120 is manually controlled, or by determining whether a predetermined driving condition of the vehicle is satisfied, e.g., when a vehicle speed exceeds a predetermined speed for a current gear.

The transmission 120 may be an automated manual transmission (AMT).

The ECU 140 controls an overall operation of the engine 110. The ECU 140 communicates with the VCU 190 through a network, for example, through a controller area network (CAN), so as to cooperate with the VCU 190.

During the control of the engine 110, the ECU 140 may monitor an operation state of the engine 110 including various control parameters, such as a request torque signal of a driver, a coolant temperature, an engine speed, a throttle opening, an intake air amount, an oxygen value of an exhaust gas, and an actual engine torque.

The ECU 140 may provide the operation state of the engine 110 to the VCU 190.

The TCU 170 controls an overall operation of the transmission 120. For example, TCU 170 may initiate and performs disengagement and engagement of shift-stages.

The TCU 170 may provide an operation state of the transmission 120 to the VCU 190.

The TCS 180 is a kind of safety system that controls driving torque of the vehicle by preventing a surplus driving torque that causes slipping of tires on the road.

The TCU 170, the TCS 180, and the ECU 140 may cooperate to control an output torque of the engine 110, for example, by controlling a fuel injection amount, an ignition timing, and a throttle valve opening.

The VCU 190 may be a supervisory controller that controls an overall operation of the vehicle. The VCU 190 may integrally control subsidiary controllers through a network, such as the CAN, by gathering and analyzing information from subsidiary controllers and executing cooperative control of the subsidiary controllers, for example, to control the output torque of the engine 110.

Figure 2:
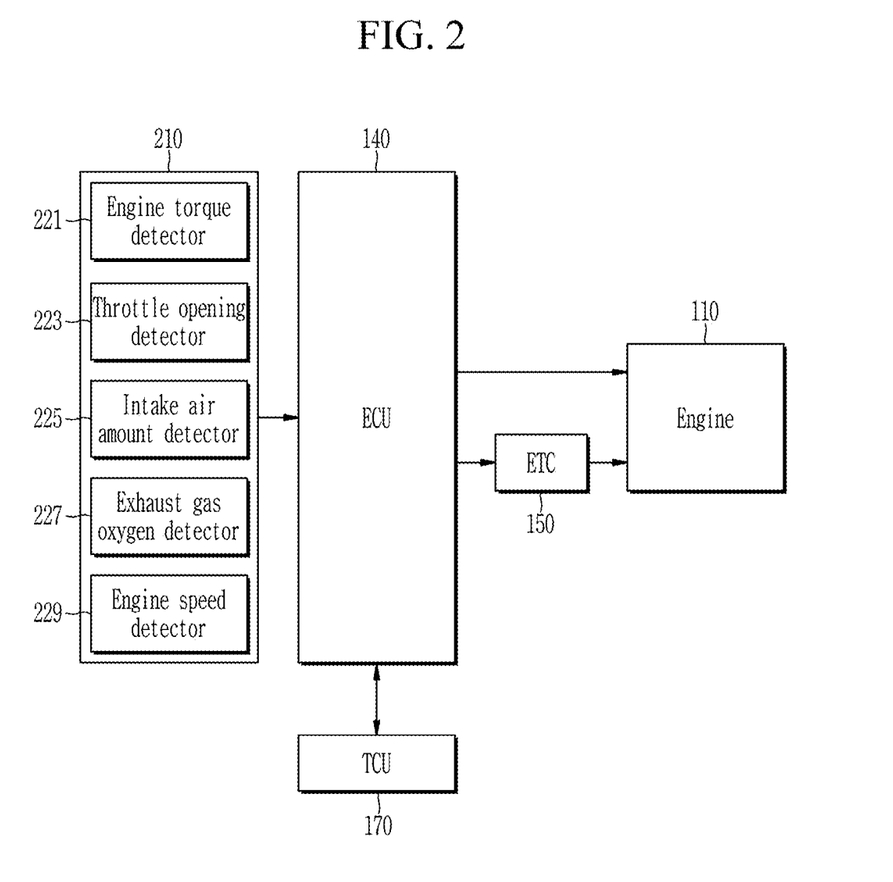
FIG. 2 is a block diagram of an apparatus for controlling a vehicle to which a method for controlling an engine of a vehicle according to an embodiment of the present invention is applied.

FIG. 2 is a block diagram of an apparatus for controlling a vehicle to which a method for controlling an engine of a vehicle according to an embodiment of the present invention is applied.

Referring to FIG. 2, an engine control apparatus for controlling the engine 110 may include the ECU 140, a throttle controller 150 that may be also called an electronic throttle controller (ETC), and a detector unit 210.

The output torque of the engine 110 is controlled by the ECU 140, for example, by adjusting an intake air amount by controlling the ETC 150.

The ECU 140 communicates with the TCU 170 through the vehicular network, e.g., CAN.

The ECU 140 may receive, from the TCU 170, an air-controlled torque request signal and an ignition-and-fuel-controlled torque request signal. The air-controlled torque request signal may be a signal requesting the ECU 140 to control an intake air amount to adjust the output torque of the engine 110 to a request torque. The ignition-and-fuel-controlled torque request signal may be a signal requesting the ECU 140 to control an ignition timing and/or a fuel injection amount to adjust the output torque of the engine 110 to a request torque. In embodiments, the TCU 170 does not merely send a single torque request signal to the ECU 140 to control the output torque of the engine 110. Rather, the TCU 170 sends two separate control signals to the ECU 140, one of which requests the ECU 140 to adjust the intake air amount and the other of which request the ECU 140 to adjust the ignition timing and/or the fuel injection amount, to adjust the output torque of the engine 110.

When a throttle valve is controlled, e.g., in order to decrease the output torque of the engine 110, responsiveness of the torque reduction of the engine 110 may not be sufficiently prompt since it takes a certain time, which may be called a delay or a lag, for the engine 110 to actually decrease the output torque. On the other hand, when the ignition timing and/or the fuel injection amount is adjusted to control the output torque of the engine 110, unnecessary fuel consumption may arise to deteriorate fuel efficiency, and preciseness in a torque control may be deteriorated. Therefore, the TCU 170 sends two separate signals, one for requesting the ECU 140 to control the throttle valve and the other for requesting the ECU 140 to control the ignition timing and/or the fuel injection amount, to the ECU 140 at appropriate timings respectively, and thereby attempts to enhance both the responsiveness and fuel efficiency of the torque control of the engine 110.

Since there may be a delay from controlling the throttle valve to obtaining an actual change of the output torque of the engine 110, the TCU 170 may send the air-controlled torque request signal to the ECU 140 earlier than a desired timing. For example, the ECU 140 may receive the ignition-and-fuel-controlled torque request signal after receiving the air-controlled torque request signal from the TCU 170.

In response to the air-controlled torque request signal, the ECU 140 controls the engine 110 to output the requested torque by controlling the ETC 150. In response to the ignition-and-fuel-controlled torque request signal, the ECU 140 controls the engine 110 to output the requested torque by controlling the ignition timing and/or the fuel amount.

The ECU 140 may perform a fuel cut of the engine 110 after a throttle opening of the throttle valve is controlled by the ETC 150. For example, the ECU 140 may perform the fuel cut of the engine 110 when the throttle opening becomes below a predetermined value. It may be understood that the predetermined value may be set to an appropriate value in consideration of specification of the engine 110 and/or other design criteria.

The ECU 140 may collect operation state data by the detector unit 210. The ECU 140 may detect an actual output torque of the engine 110 based on the information of the operation state data, and may generate an engine torque signal representing the actual output torque of the engine 110. The ECU 140 sends the engine torque signal to the TCU 170 such that the TCU 170 may determine whether a desired output torque is realized and/or how much difference remains between the desired and actual output torques of the engine 110. The engine torque signal from the ECU 110 may be generated in response to the air-controlled torque request signal and the ignition-and-fuel-controlled torque request signal received from the TCU 170.

The ECU 140 may be implemented as at least one microprocessor operating by a predetermined program, and the predetermined program may include instructions for executing a method for controlling an engine of a vehicle according to an embodiment of the present invention. A method for controlling an engine of a vehicle will be described in more detail with reference to FIG. 3 to FIG. 5.

The ETC 150 controls the throttle valve according to the control of the ECU 140. In embodiments, under the control of the ECU 140, the ETC 150 may decrease or increase the throttle opening of the throttle valve to decrease or increase the output torque of the engine 110.

The TCU 170 controls shifting operation of the transmission 120, in cooperation with the ECU 140. In order to obtain the cooperative control of the engine 110 by the ECU 140 for the shifting operation of the transmission 120, the TCU 170 may generate the air-controlled torque request signal and the ignition-and-fuel-controlled torque request signal.

The TCU 170 may send the air-controlled torque request signal and the ignition-and-fuel-controlled torque request signal, sequentially to the ECU 140.

The TCU 170 receives the engine torque signal from the ECU 140, and performs the shifting operation of the transmission 120 when the engine torque of the engine 110 is appropriate.

The detector unit 210 may detect the operation state data of the engine 110. The detector unit 210 may include an engine torque detector 221, a throttle opening detector 223, an intake air amount detector 225, an exhaust gas oxygen detector 227, and an engine speed detector 229.

The engine torque detector 221 detects the actual output torque of the engine 110. The engine torque detector 221 provides the detected output torque of the engine 110 to the ECU 140.

The throttle opening detector 223 detects an opening ratio, i.e., throttle ratio, of the throttle valve of the engine 110. The throttle opening detector 223 provides the detected throttle ratio of the throttle valve to the ECU 140.

The intake air amount detector 225 detects an intake air amount supplied to the engine 110. The intake air amount detector 225 provides the detected intake air amount of the engine 110 to the ECU 140.

The exhaust gas oxygen detector 227 detects oxygen component in an exhaust gas of the engine 110, and supplies a lambda value A corresponding to the oxygen component to the ECU 140. The lambda value may represent an actual intake air amount with respect to a theoretically required air amount. An air/fuel mixture combusted in the engine 110 may be considered to be lean when the lambda value exceeds a value of 1, and the air/fuel mixture combusted in the engine 110 may be considered to be rich when the lambda value is below the value of 1.

The engine speed detector 229 may detect a rotation speed of the engine 110, and supply the detected rotation speed to the ECU 140.

It may be understood that the detector unit 210 may additionally include one or more detectors such as a coolant temperature detector, a vehicle speed detector, a brake pedal detector, and an accelerator pedal detector, where applicable.

A method for controlling the engine 110 of the vehicle is hereinafter described in detail with reference to FIG. 3 to FIG. 5.

Figure 3:
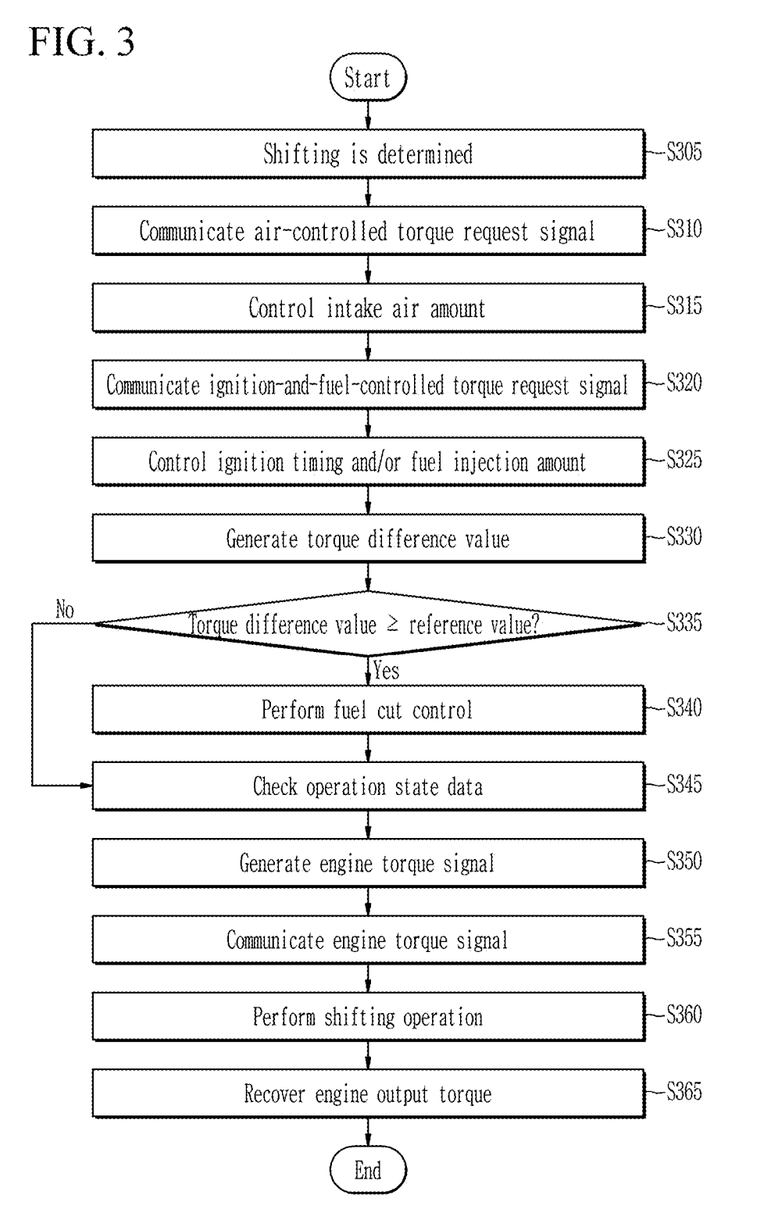
FIG. 3 is a flowchart showing a method for controlling an engine of a vehicle according to an embodiment of the present invention.

FIG. 3 is a flowchart showing a method for controlling an engine of a vehicle according to an embodiment of the present invention. FIG. 4 is a diagram illustrating torque signals and an engine torque in implementation of a method for controlling an engine of a vehicle according to an embodiment of the present invention.

It may be firstly explained that a motivation of the method for controlling an engine of the vehicle is to control the output torque of the engine by two separate signals of the air-controlled torque request signal and the ignition-and-fuel-controlled torque request signal such that the output torque of the engine 110 may be controlled timely and precisely.

Figure 4:
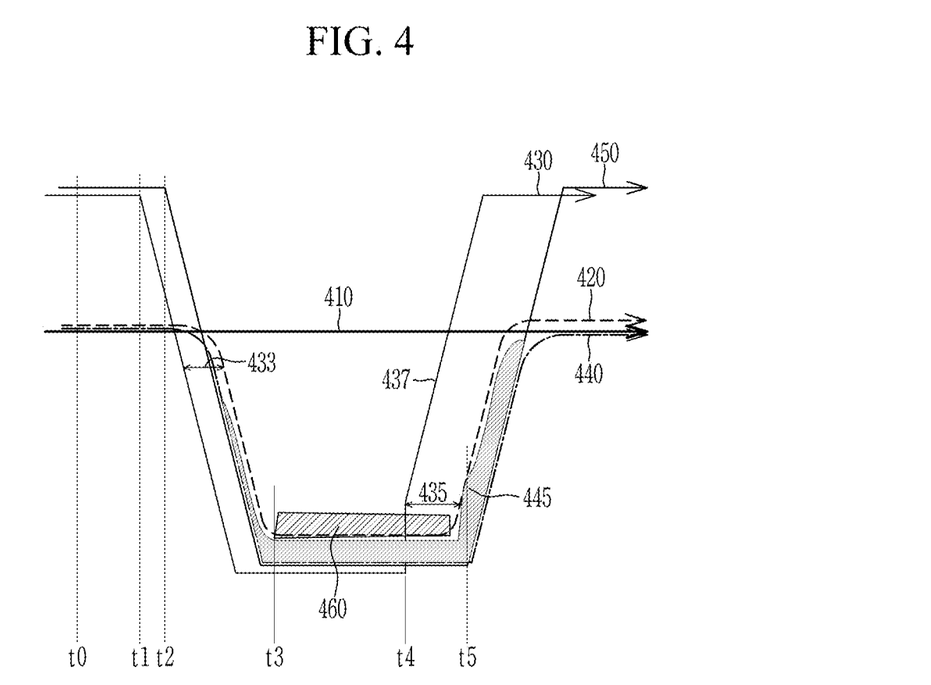
FIG. 4 is a diagram illustrating torque signals and an engine torque in implementation of a method for controlling an engine of a vehicle according to an embodiment of the present invention.

In FIG. 4, a reference numeral 410 represents a driver's request torque, e.g., indicating how much level an accelerator pedal is depressed by, and a reference numeral 440 represents an actual output torque of the engine 110. At a time t0, the actual torque 440 of the engine 110 meets the driver's request torque 410. A reference numeral 430 represents the air-controlled torque request signal, and a reference numeral 450 represents the ignition-and-fuel-controlled torque request signal. It may be understood that the level of the two signals 430 and 450 at the time t0 represents only a base level or a reference level, and may not necessarily mean an absolute value in terms of the engine output torque.

At time t0 in FIG. 4 and at step S305 in FIG. 3, the TCU 170 may determine to initiate a shifting operation, e.g., to a higher gear due to an increase of a vehicle speed.

Then, the TCU 170 may request a decrease of the engine output torque to the ECU 170, by utilizing the two signals of the air-controlled torque request signal and the ignition-and-fuel-controlled torque request signal. Since torque decrease of the engine 110 may show a time delay after controlling the throttle opening, the TCU 170 may request the ECU 140 to decrease the engine output torque by controlling the intake air amount, slightly earlier than an actually desired timing of the engine output torque decrease.

In this background, at step S310 in FIG. 3, the TCU 170 sends the air-controlled torque request signal, at a time earlier, by an expected delay 433, than a desired decrease timing. Therefore, at the step S310 the ECU 140 receives the air-controlled torque request signal.

Then, at step S315, the ECU 140 starts controlling of the ETC 150 of the engine 110 in response to the received air-controlled torque request signal. In implementations, the ECU 140 controls the ETC 150 based on the air-controlled torque request signal to adjust, e.g., to decrease the output torque of the engine 110 by adjusting the throttle opening of the throttle valve of the engine 110.

The decrease of output torque of the engine 110 will have a delay 433, and may follow a line 420 based on the intake air control by the ECU 140 in response to the air-controlled torque request signal. That line 420 does not necessarily match the desired output torque line 440 and may have a deviation that may be finely adjusted.

In this regard, at time t2 in FIG. 4 and at step S320 in FIG. 3, the TCU 170 may further generate and send the ignition-and-fuel-controlled torque request signal 450 to the ECU 140, and the ECU 140 may receive the ignition-and-fuel-controlled torque request signal. Based on the ignition-and-fuel-controlled torque request signal, the ECU 140 may determine a target torque value desired by the TCU 170.

In response to the ignition-and-fuel-controlled torque request signal 440, the ECU 140 controls the ignition timing and/or the fuel injection amount of the engine 110, at step S325. For example, the ECU 140 controls both or either of the ignition timing and the fuel injection amount of the engine 110 based on the ignition-and-fuel-controlled torque request signal 440 to further adjust the engine output torque, in addition to adjusting the engine output torque based on the air-controlled torque request signal. Therefore, a resultant engine output torque may match the desired output torque 440 more precisely.

It may be understood that the responsiveness of the output torque of the engine 110 may be relatively prompt in response to adjusting the ignition timing and/or the fuel injection amount. Therefore, the ECU 140 may feedback control the output torque of the engine 110 by controlling the ignition timing and/or the fuel injection amount. For example, the ECU 140 may retard the ignition timing to decreasingly adjust engine output torque and advance the ignition timing to increasingly adjust the engine output torque. The ECU 140 may decrease the fuel injection to decreasingly adjust engine output torque and increase the fuel injection amount to increasingly adjust the engine output torque, in consideration of a current operation state of the engine 110.

The actual output torque of the engine 110 obtained by controlling the intake air amount, the ignition timing, and the fuel injection amount may be monitored by the ECU 140 through the engine torque detector 221. In another example, the actual output torque of the engine 110 may be monitored by the TCU 170 by receiving the output torque value from the ECU 140. While monitoring the decrease of the actual engine output torque, the ECU 140 (or the TCU 170) may calculate a torque difference value between the target torque value (e.g., the desired torque line 440) and the actual engine output torque value, at step S330

There may be a case that the actual output torque of the engine may still show a deviation from the desired output torque. Therefore, at step S335, the ECU 140 determines whether the torque difference value exceeds a reference value. The reference value may be appropriately set as a criterion to determine whether a fuel cut may be performed to force the output torque of the engine 110 to decrease further steeply to precisely match the desired output torque.

At step S340, the ECU 140 performs the fuel cut control of the engine 110 when the torque difference value exceeds the reference value. For example, the ECU 140 may start the fuel cut control at time t3 in FIG. 4, and may maintain the fuel cut control during a period 460.

In more detail, when the torque difference value exceeds the reference value (S335—Yes), the ECU 140 may determine the number of cylinders to perform the fuel cut control, and may perform the fuel cut control to the determined number of cylinders. For example, in the case that the torque difference value is 7.5 Nm for a 4-cylinder engine, the ECU 140 may determine the number of cylinders to be 3 to perform the fuel cut control for 3 cylinders of the four cylinders.

By performing such a fuel cut control, the output torque of the engine 110 may be decreased further steeply to better follow the desired output torque.

It is notable that the fuel cut control may be performed after the intake air amount is firstly decreased and then the ignition timing and the fuel injection amount is controlled. Accordingly, at the time of performing the fuel cut control, the intake air amount and the fuel injection amount may become minimal. Therefore, adjustment of the fuel injection amount in relation with the intake air amount may become smooth such that the oxygen component in the exhaust gas may not change abruptly. Therefore, the component of noxious gas such as nitrogen oxide (NOx) in the exhaust gas may remain minimized during the control of the output torque of the engine 110.

When the torque difference value is below the reference value (S335—No), the ECU 140 may skip the fuel cut control of the step S340.

At step S345, the ECU 140 checks the operation state data of the engine 110. For example, the detector unit 210 may detect the operation state data such as the intake air amount, the lambda value, and the rotation speed of the engine 110. The operation state data detected by the detector unit 210 is transmitted to the ECU 140.

At step S350, the ECU 140 may generate the engine torque signal based on the operation state data. The engine torque signal represents the actual output torque of the engine 110 and may be calculated by the ECU 140 based on the intake air amount, the lambda value, and the rotation speed of the engine 110 included in the operation state data.

At step S355, the ECU 140 sends the engine torque signal to the TCU 170, and the TCU receives the engine torque signal. Thus, the ECU 140 may inform the TCU 170 that the output torque of the engine 110 has been adjusted based on the air-controlled torque request signal and the ignition-and-fuel-controlled torque request signal, and the TCU 170 may determine that the output torque of the engine 110 has been adjusted, e.g., decreased, to an appropriate level for the desired shifting operation. At the step S355, the TCU 170 may feedback control the output torque of the engine 110 until the output torque of the engine 110 becomes appropriate.

Subsequently at step S360, the TCU 170 performs the shifting operation of the transmission 120 determined at the step S305, while the output torque of the engine 110 remains at the appropriate level by the control of the ECU 140, e.g., during the period between the time t3 and the time t4 in FIG. 4.

When the shifting operation of the transmission 120 is finished, for example, at time t4 in FIG. 4 and at step S365 in FIG. 3, the TCU 170 may send instruction signals to the ECU 140 to recover the output torque of the engine 110 to the original level of the driver's request torque.

This recovering step S365 of the engine output torque may be performed similarly to the decreasing of the engine output torque described above. For example, the TCU 170 firstly sends the air-controlled torque request signal at the time t4. Then, the ECU 140 may control the intake air amount of the engine 110 to roughly recover the output torque to the original level. The recovery of the output torque of the engine 110 may arise at time t5 in FIG. 4 with a delay 435 from the time t4. At time t5, the TCU 170 may send the ignition-and-fuel-controlled torque request signal to the ECU 140, and the ECU 140 may control the ignition timing and the fuel injection amount of the engine 110 to precisely recover the output torque of the engine 110 to the original level.

Figure 5:
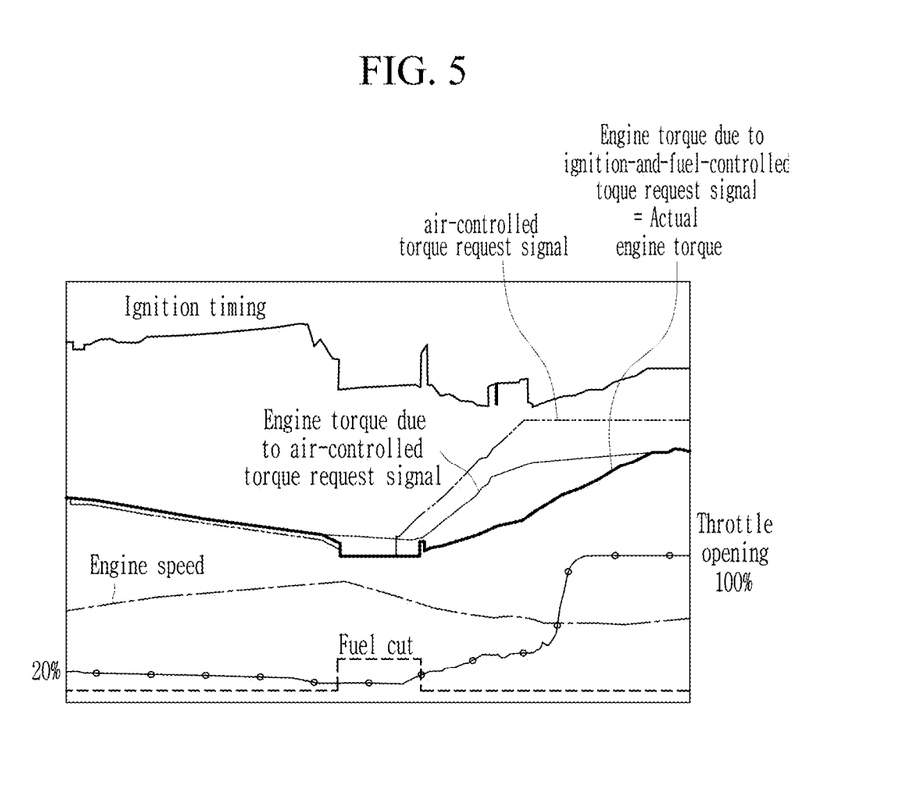
FIG. 5 is a graph illustrating various signals in implementation of a method for controlling an engine of a vehicle according to an embodiment of the present invention.

FIG. 5 is a graph illustrating various signals in implementation of a method for controlling an engine of a vehicle according to an embodiment of the present invention. In implementation of a method for controlling an engine of a vehicle, the ECU 140 starts reducing the output torque of the engine 110 by controlling the intake air amount of the engine 110 in response to the air-controlled torque request signal received in advance of the ignition-and-fuel-controlled torque request signal. The output torque of the engine 110 in response to the air-controlled torque request signal shows a delay and may not sufficiently match the desired output torque curve (thick solid line in FIG. 5). When the ignition-and-fuel-controlled torque request signal is added, the actual output torque of the engine 110 may precisely match the desired output torque curve (thick solid line in FIG. 5).

By adjusting, e.g., decreasing, the output torque of the engine 110 firstly and primarily by controlling the intake air amount of the engine 110 and subsequently and secondarily by controlling the ignition timing and the fuel injection amount, fuel efficiency may be improved and noxious component in the exhaust gas may be decreased.

By controlling the output torque of the engine 110 by the two separate signals of the air-controlled torque request signal and the ignition-and-fuel-controlled torque request signal, the output torque of the engine 110 may be controlled to match the desired output curve rapidly and also precisely.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

While embodiments of this invention have been described, it is to be understood that the invention is not limited to the disclosed embodiments. On the contrary, it is intended to cover various modifications and equivalent arrangements included within the spirit and scope of the appended claims.

DESCRIPTION OF SYMBOLS

110: engine
120: transmission
140: ECU
150: ETC
170: TCU
180: TCS
190: VCU
210: detector unit
221: engine torque detector
223: throttle opening detector
225: intake air amount detector
227: exhaust gas oxygen detector
229: engine speed detector

What is claimed is:

1. A method of controlling an engine of a vehicle having the engine and a transmission, the method comprising:
receiving, by an engine controller, an air-controlled torque request signal from a transmission controller for a shifting operation;
adjusting, by the engine controller, an output torque of the engine by controlling an intake air amount of the engine based on the air-controlled torque request signal;
receiving, by the engine controller, an ignition-and-fuel-controlled torque request signal sent from the transmission controller after receiving the air-controlled torque request signal;
determining, by the engine controller, a target torque value based on the ignition-and-fuel-controlled torque request signal; and
further adjusting, by the engine controller, the output torque of the engine by controlling both or either of an ignition timing and a fuel amount of the engine based on the target torque value.

2. The method of claim 1, further comprising, after the adjusting of the output torque of the engine by controlling the ignition timing and/or the fuel amount:
detecting an actual output torque value of the engine;
performing a fuel cut control of the engine based on the target torque value and the actual output torque value during the shifting operation; and
maintaining the fuel cut control of the engine during the shifting operation.

3. The method of claim 2, wherein the performing of the fuel cut control of the engine comprises:
calculating a torque difference value between the target torque value and the actual output torque value;
determining whether the torque difference value exceeds a reference value;
determining a number of cylinders to perform the fuel cut control, when the torque difference value exceeds the reference value; and
performing the fuel cut control with respect to the number of cylinders.

4. The method of claim 2, further comprising, after the maintaining the fuel cut control of the engine during the shifting operation,
- receiving, by the engine controller, an air-controlled torque recovery request signal from the transmission controller;
- starting, by the engine controller, controlling the intake air amount of the engine in response to the air-controlled torque recovery request signal, to recover the output torque of the engine to an original level;
- receiving, by the engine controller, an ignition-and-fuel-controlled torque recovery request signal from the transmission controller, after receiving the air-controlled torque recovery request signal; and
- controlling, by the engine controller, the ignition timing and the fuel injection amount of the engine in response to the ignition-and-fuel-controlled torque recovery request signal, to recover the output torque of the engine to the original level.

5. The method of claim 1, further comprising, after the adjusting of the output torque of the engine by controlling both or either of the ignition timing and the fuel amount:
- checking operation state data of the engine;
- generating an engine torque signal based on the operation state data of the engine; and
- communicating the engine torque signal between the engine controller and the transmission controller.

6. The method of claim 5, wherein the operation state data comprises at least one of an intake air amount, a lambda value, and a rotation speed of the engine.

7. The method of claim 5, wherein the engine torque signal represents an actual output torque of the engine.

8. A method for controlling of an engine of a vehicle, the vehicle comprising a transmission, a transmission controller to control the transmission, and an engine controller to control the engine, the method comprising:
- receiving, by the engine controller, an air-controlled torque request signal from the transmission controller for a shifting operation;
- adjusting, by the engine controller, an output torque of the engine by controlling an intake air amount of the engine based on the air-controlled torque request signal;
- receiving, by the engine controller, an ignition-and-fuel-controlled torque request signal sent from the transmission controller after receiving the air-controlled torque request signal;
- based on the ignition-and-fuel-controlled torque request signal, further adjusting, by the engine controller, the output torque of the engine by controlling both or either of an ignition timing and a fuel amount;
- detecting an actual output torque value of the engine; and
- performing a fuel cut control of the engine based on the actual output torque value of the engine during the shifting operation.

9. The method of claim 8, wherein the adjusting of the output torque of the engine by controlling both or either of the ignition timing and the fuel amount comprises:
- determining a target torque value based on the ignition-and-fuel-controlled torque request signal; and
- adjusting the output torque of the engine by controlling an ignition timing and/or a fuel amount of the engine based on the target torque value.

10. The method of claim 9, wherein the fuel cut control of the engine is performed based on the target torque value and an actual output torque value.

11. The method of claim 8, further comprising, after the performing of the fuel cut control of the engine:
- checking operation state data of the engine;
- generating an engine torque signal based on the operation state data of the engine; and
- communicating the engine torque signal between the engine controller and the transmission controller.

12. The method of claim 8, further comprising,
- maintaining the fuel cut control of the engine during the shifting operation.

13. The method of claim 12, further comprising, after the maintaining the fuel cut control of the engine during the shifting operation,
- receiving, by the engine controller, an air-controlled torque recovery request signal from the transmission controller;
- starting, by the engine controller, controlling the intake air amount of the engine in response to the air-controlled torque recovery request signal, to recover the output torque of the engine to an original level;
- receiving, by the engine controller, an ignition-and-fuel-controlled torque recovery request signal from the transmission controller, after receiving the air-controlled torque recovery request signal; and
- controlling, by the engine controller, the ignition timing and the fuel injection amount of the engine in response to the ignition-and-fuel-controlled torque recovery request signal, to recover the output torque of the engine to the original level.

* * * * *